Aug. 12, 1969   G. RABILLOUD ET AL   3,461,096
HETEROCYCLIC POLYMERS OF IMPROVED THERMAL STABILITY CONSISTING
OF POLYISOINDOLOQUINAZOLINE DIONES AND ANALOGS THEREOF
Filed Oct. 28, 1966                               5 Sheets-Sheet 1
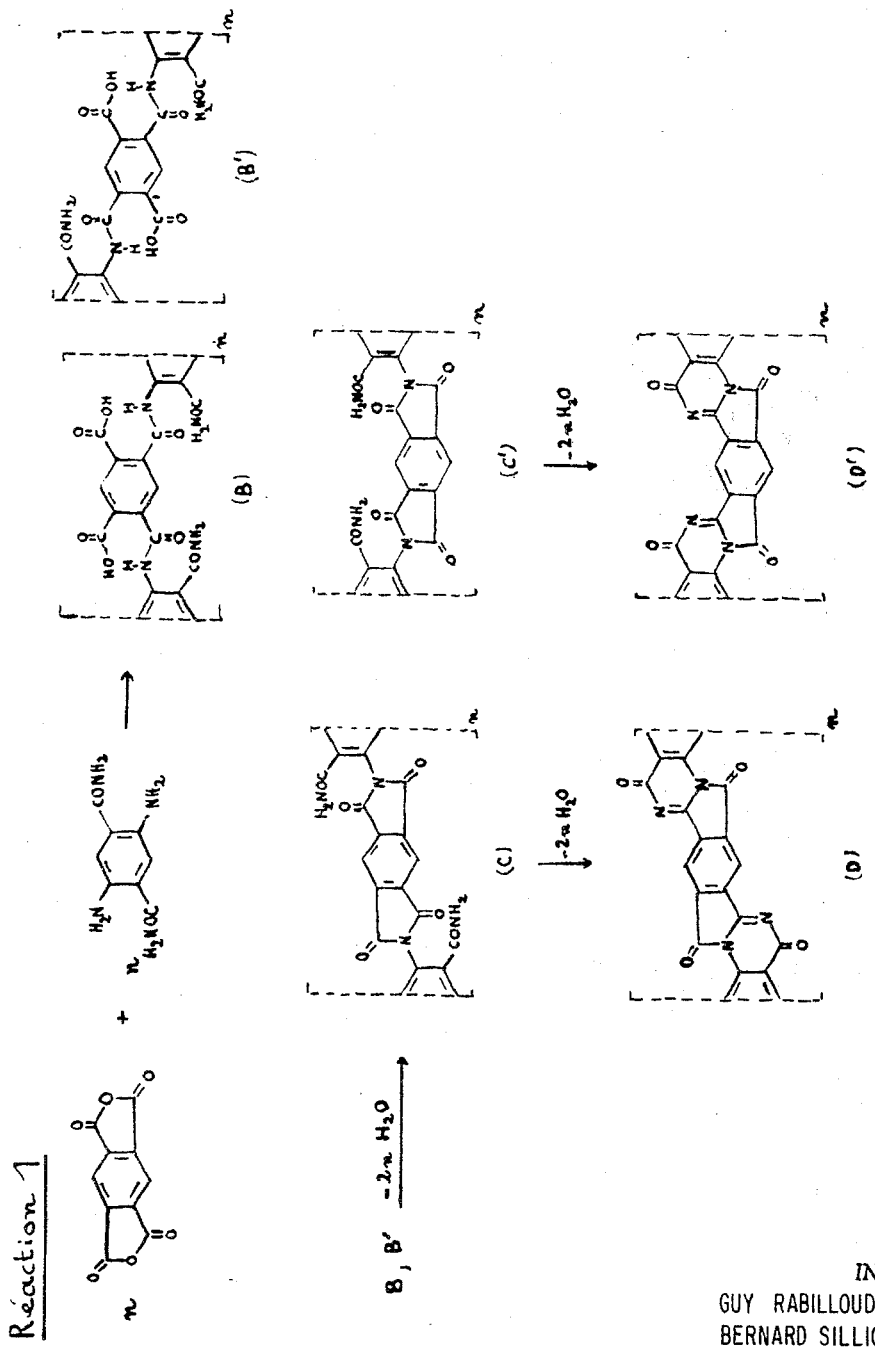
INVENTORS
GUY RABILLOUD
BERNARD SILLION
GABRIEL DE GAUDEMARIS
BY
ATTORNEY

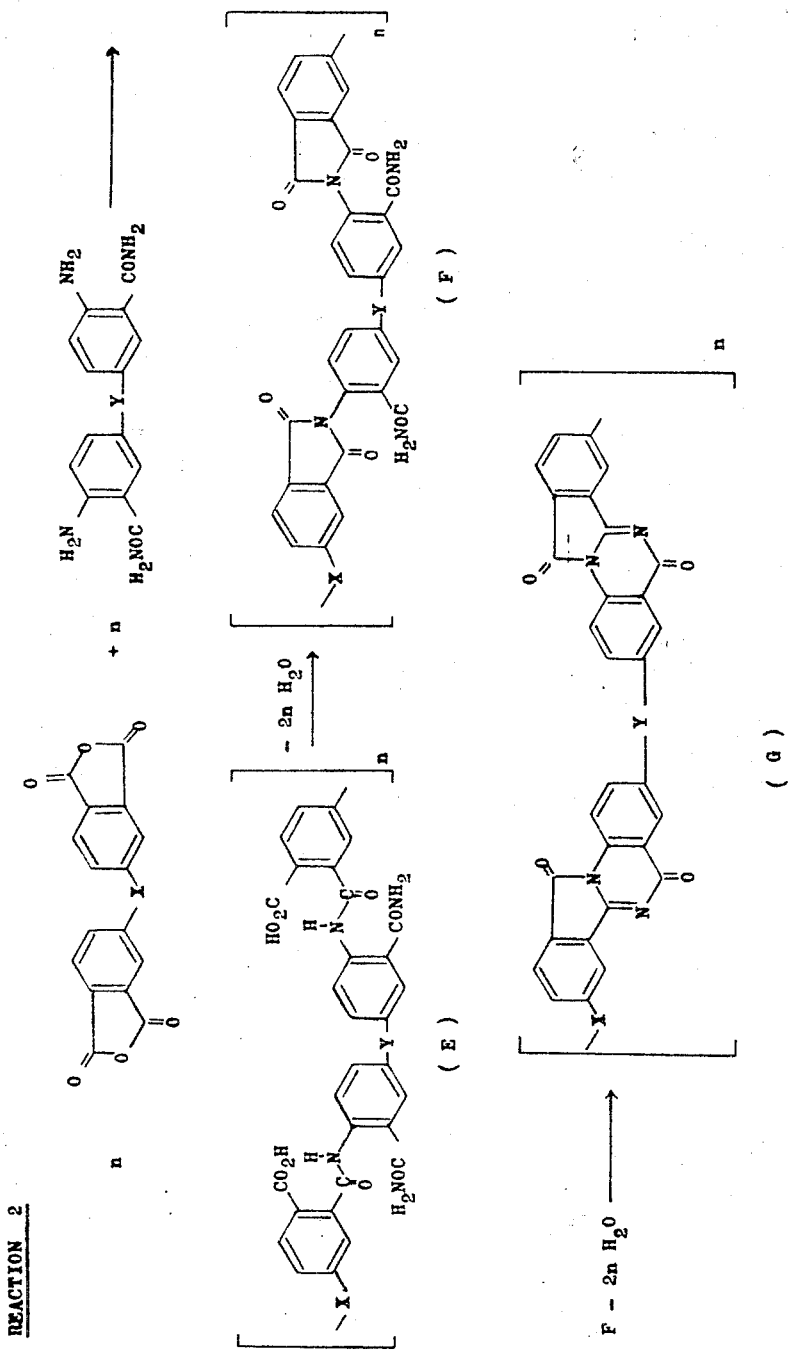

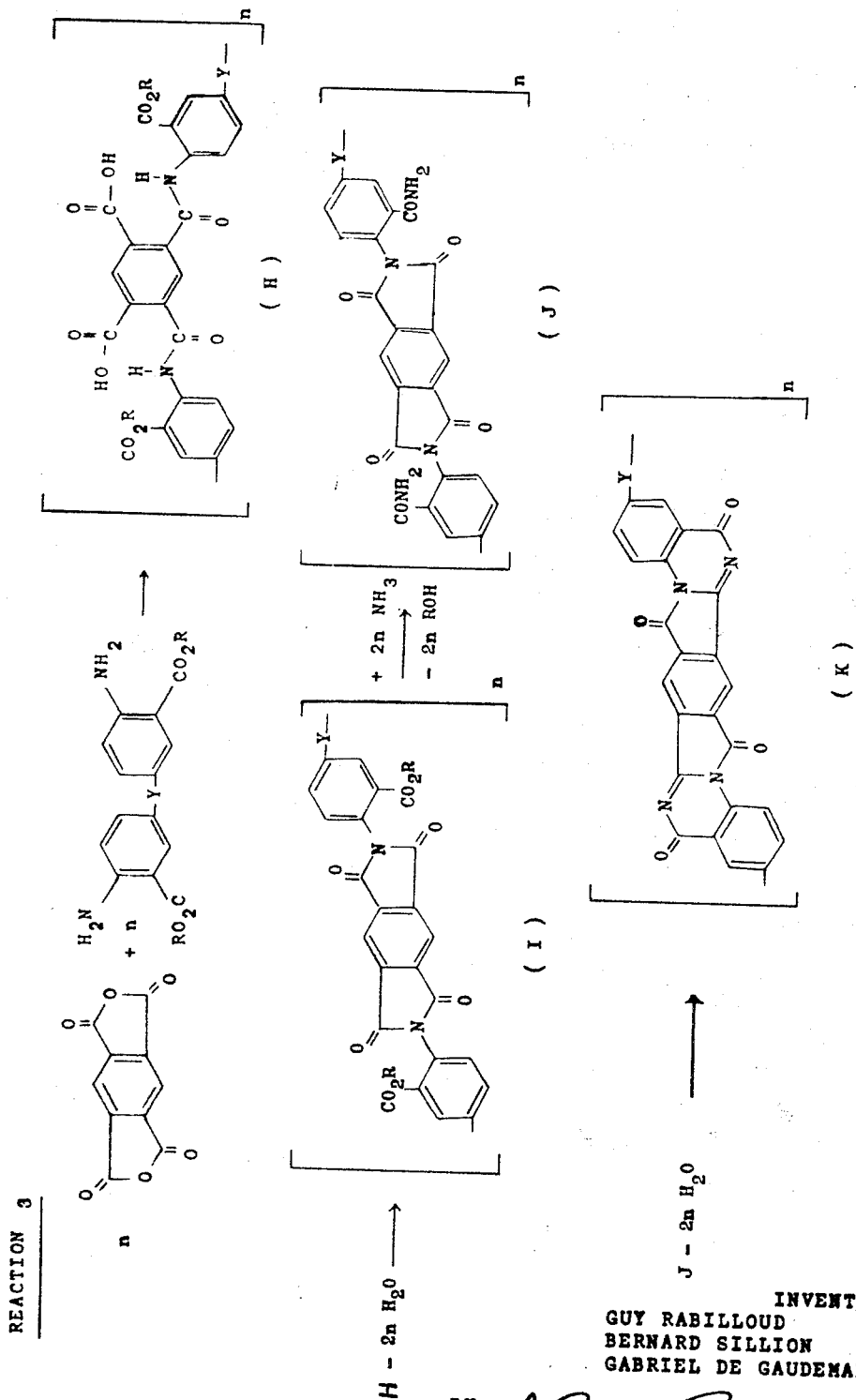

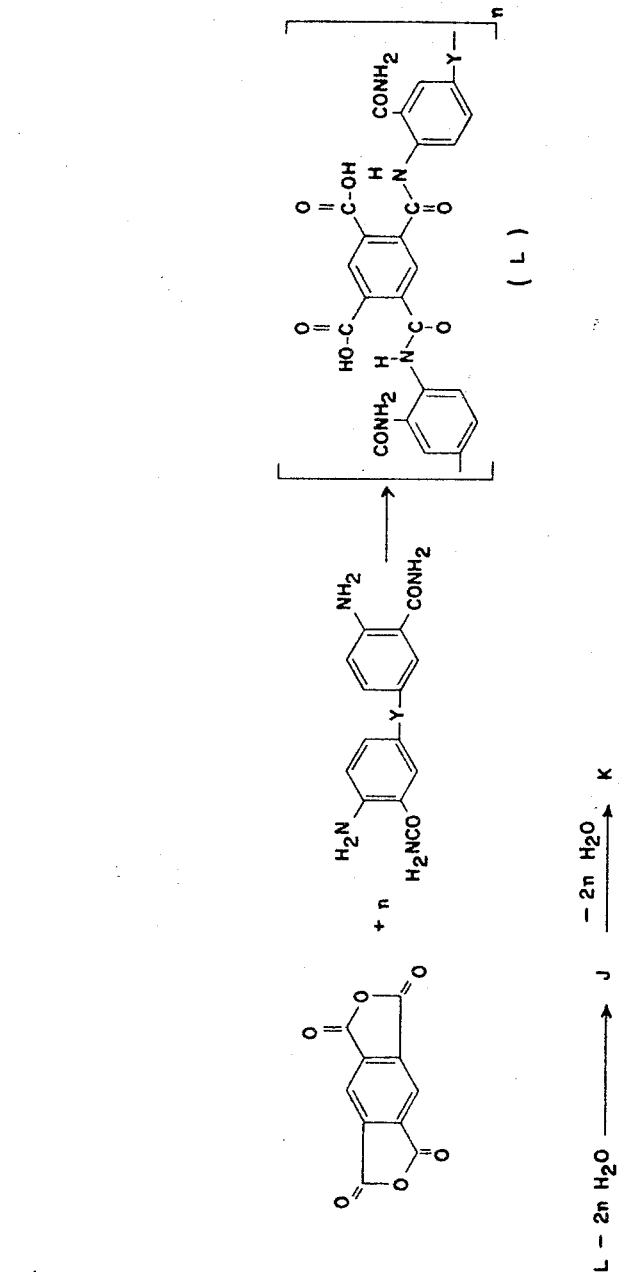

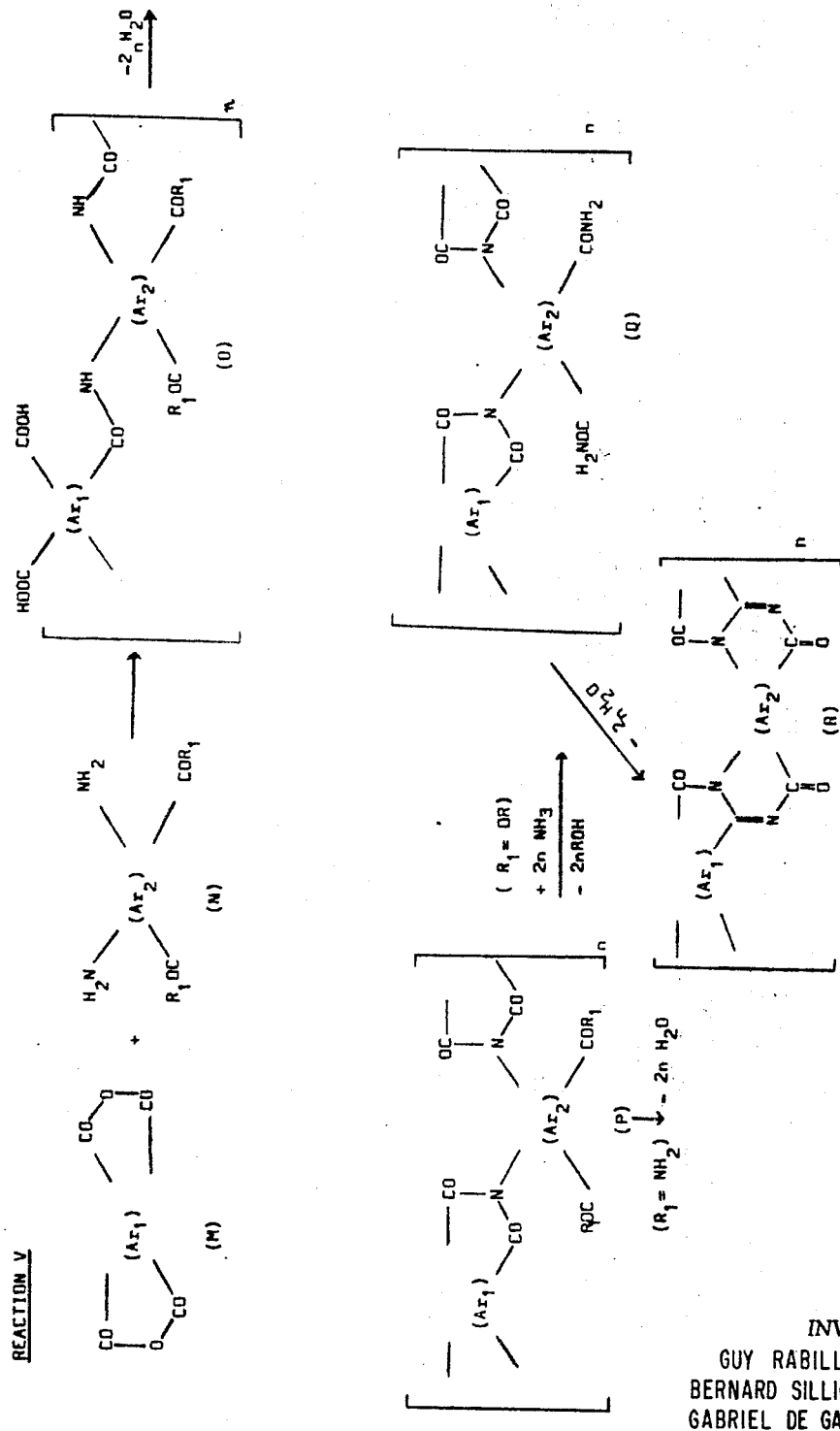

United States Patent Office 3,461,096
Patented Aug. 12, 1969

3,461,096
HETEROCYCLIC POLYMERS OF IMPROVED THERMAL STABILITY CONSISTING OF POLYISOINDOLOQUINAZOLINE DIONES AND ANALOGS THEREOF
Guy Rabilloud, Bernard Sillion, and Gabriel de Gaudemaris, Grenoble, France, assignors to Institut Francais du Petrole, des Carburants, et Lubrifiants, Rueil-Malmaison, Hauts-de Seine, France
Filed Oct. 28, 1966, Ser. No. 590,374
Claims priority, application France, Oct. 28, 1965, 36,603
Int. Cl. C08g 20/32
U.S. Cl. 260—47
14 Claims

ABSTRACT OF THE DISCLOSURE

As heterocyclic polymers exhibiting high thermal stability and particularly applicable for the production of laminates and the like, there are provided polymers of the following structural formulae:

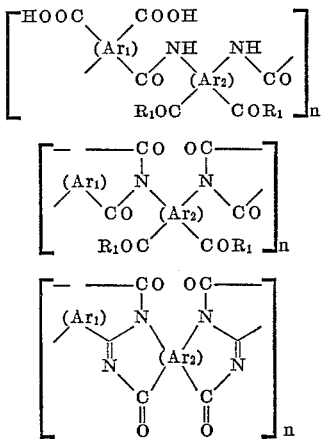

wherein:
$Ar_1$ and $Ar_2$ are aromatic radicals having two pairs of ortho-positioned free valences, and
$R_1$ is —$NH_2$ or —OR, where R is a monovalent hydrocarbon.

---

Applicants hereby claim the benefit of the filing date of French patent application P.V. No. 36,603 of Oct. 28, 1965.

This invention relates to novel heterocyclic polymers having improved thermal stabilities, and which can be utilized for the production of films, fibers, filaments, molded objects, coating compositions, such as varnishes, laminates, reinforced compositions, etc.

There is a need for thermally stable polymers which can be fabricated into the above-mentioned forms. Accordingly, it is the principal object of this invention to provide novel polymers which fulfill this need.

Another object of this invention is to provide novel processes and novel intermediate based on such processes, for the production of the polymers of this invention.

Another object is to provide laminates or reinforced compositions having inert materials impregnated with the polymers of this invention.

Upon further study of the specification and appended claims, other objects, features, and advantages of the present invention will become apparent.

In the drawings:
FIGURES 1 through 5 are reaction equations showing the preparation of the novel polymers of this invention.

Referring now specifically to FIGURE 5, Formula R broadly describes the novel polymers of this invention wherein:

$A_1$ and $Ar_2$ represent aromatic radicals, homocyclic or heterocyclic, which have two pairs of ortho-positioned free valences, making a total of four free valences. It is preferred that each of $Ar_1$ and $Ar_2$ contain 4–20 carbon atoms. As preferred examples of $Ar_1$ and $Ar_2$, there are included the following:

(a) Aromatic hydrocarbons, such as benzene, toluene, naphthalene, anthracene, perylene, phenanthrene, diphenyl, and terphenyl.

(b) Aromatic compounds corresponding to the formula

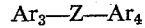

where $Ar_3$ and $Ar_4$ are monovalent hydrocarbon radicals, such as those mentioned in (a), and Z is a divalent moiety, such as O, S, SO, $SO_2$, CO, $CH_2$, $C(CH_3)_2$, N-alkyl, N-aryl, etc.

(c) Heterocyclic aromatic compounds, such as furan, thiophene, pyridine, quinoline, isoquinoline, and phenazine.

$R_1$ represents $NH_2$ or OR, where R is a monovalent hydrocarbon radical, such as saturated or unsaturated alkyl of 1–12 carbon atoms, or aryl of 6–12 carbon atoms.

In general, the polymers of this invention are produced by reacting at least one dianhydride of an aromatic tetraacid with at least one bis-orthoamino-amide or a bis-orthoamino-ester (the ester functions being easily transformed during the course of the polycondensation reaction into amide functions).

More specifically, inviting attention to FIGURE 5, Reaction 5, it is seen that the dianhydride of Formula M reacts with the compound of Formula N to yield intermediate polymers of the Formulae O and P. The latter can then be directly converted by a cyclization reaction into the final polymers R if $R_1$ is $NH_2$. On the other hand, if $R_1$ is OR, it is necessary to conduct a further reaction in order to convert OR into $NH_2$ (polymers of Formula Q before proceeding with the final cyclization reaction.

With respect to the degree of polycondensation n of the polymers, a direct measurmeant of this variable cannot be accomplished accurately by conventional means. By virtue of the final properties of the polymers, it is apparent, however, that n must have a value of at least 5. On the other hand, the polymers are identifiable by their elementary analysis, and as the occasion arises, by their viscosity.

If the aromatic nuclei of the starting materials are fused as for example in naphthalene of quinoline, or if one only aromatic nucleus is present in each of said materials, the process results in the production of "stepladder" polymers, as shown in FIGURE 1, wherein pyromellitic dianhydride is reacted with 2,5-diaminoterephthalamide. In this connection, it is to be noted that compounds of Formulae B, C, D, or isomers thereof B', C', D', or more probably, a mixture thereof, can be obtained. In these formulae, as well as in the other formulae indicated in the drawings, n indicates the degree of polycondensation.

In contrast to the stepladder polymers shown in FIGURE 1, when several aromatic nuclei are present in the starting materials, said nuclei being separated by a carbon-to-carbon single bond, or groups similar thereto, such as methylene, carbonyl, oxide, sulfide, sulfoxide, sulfone, etc., the resultant polymer is only partially in the "stepladder" form, due to the existence of X and/or Y groups corresponding to the bonds or bonding groups just mentioned. The production of this type of polymer is illustrated by the reaction of dianhydride of benzophenone tetracarboxylic acid-3,3',4,4' with 4,4'-diamino-diphenyldicarbonamide-3,3′. This reaction would be the same as that represented in FIGURE 2 wherein X represents —CO— and Y is a single bond.

It is also to be noted that for a sure "stepladder" polymer to be obtained, a single bond or equivalent thereof cannot be present between two aromatic nuclei in the bis-orthoamino-amide or bis-orthoamino-ester starting material. Thus, even if the reaction depicted in FIGURE 2 would have started on the basis of pyromellitic dianhydride, only a partial "stepladder" structure would have been obtained.

Such a reaction is depicted in FIGURES 3 and 4.

In the reaction shown in FIGURES 2, 3, and 4, X and Y can be identical or different, and represent a single bond or a bivalent moiety, for example, —$CH_2$—, —CO—, —O—, —$SO_2$—, —SO—, —S—, or —$C(CH_3)_2$—.

With respect to FIGURES 2, 3, and 4, it is to be noted that they do not illustrate the various isomers that are possible, as in the case of FIGURE 1. However, this is done merely for the purpose of simplification, as one skilled in the art can easily deduce the various possible isomers of Reactions 2, 3, and 4 which would be analogous to the isomers set forth in FIGURE 1.

As indicated above, it is possible to replace the amide groups by functional equivalents thereof, such as esters which are easily converted into amides by treatment with ammonia. This reaction implies the formation of a polyamide having ester functions which are split off by ammonia and then cyclized. This type of reaction is illustrated in FIGURE 3 by the condensation of pyromellytic anhydride with 4,4′-diamino-diphenyl-ethyl-carboxylate-3,3′.

In view of the aforesaid description of the generic character of this invention, it is to be appreciated that one can produce a large number of different copolymers by merely varying the type and/or relative proportions of the various starting materials. Such copolymers are to be considered within the scope of this invention, but to attempt to catalog all the various permutations and combinations of a generic invention such as this would be repeating what is obvious to one skilled in the art, and of more importance, would tend to cloud the essence of the invention.

The polycondensation reaction can be conducted either by melting the reactants, or by reacting them in the presence of a polar solvent which is inert to the starting materials and final products. No matter what type of reaction is selected, it is preferred, in any event, to heat the reactants to a temperature of at least 200° C. at least during the final step of the reaction. In this connection, it is particularly advantageous to heat the reactants to at least 250° C. for at least 15 minutes.

The following description is directed to additional details regarding the techniques employed for the production of the polymers of this invention:

(1) POLYCONDENSATION OF A DIANHYDRIDE WITH A BIS-(ORTHOAMINO-AMIDE)

(a) Fusion reaction

A dianhydride of an aromatic tetracarboxylic acid and a bis-aromatic-(orthoamino-amide) are mixed intimately in preferably equimolar proportions. The mixture is progressively heated under an inert atmosphere until the mass is entirely melted. This melting temperature is usually in the range of about 220–300° C., according to what reactants are employed.

A slight amount of water is evolved as the heterocyclic compounds, probably the imides, are formed, and the mixture is then solidified little by little. The pressure is then lowered, for example, to about 0.1–0.5 mm. Hg, whereas the temperature is progressively raised to about 300–370° C., and this thermal treatment under vacuum is continued for about 2–3 hours. In this manner, the volatile compounds evolved from the reaction mass are expelled, and the cyclization reaction is completed.

(b) Reaction in a solvent

For the production of the polymers of this invention in a solvent solution, it is preferred to use highly polar solvents, such as dimethyl formamide, N-methyl acetamide, dimethyl acetamide, dimethyl sulfoxide, N-methyl pyrrolidone, pyridine, etc. In these solvents, the reaction proceeds at about ambient temperature. Due to the exothermic nature of the polycondensation reaction, a slight increase in temperature is observed (25–35° C.). Furthermore, a substantial increase in the viscosity of the solution is observed. The polycondensation reaction can be conducted by any one of the following preferred methods while using the reactants in preferably equimolar proportions:

(i) The solid dianhydride is added in a single batch or in increments thereof to a solution or a suspension of bis-(orthoamino-amide) in a solvent.

(ii) Each of the reactants is separately dispersed in solvent, and the two resultant dispersions are then mixed with vigorous agitation.

(iii) An intimate mixture of the two reactants is slowly poured into a vigorously agitated solvent solution.

The probable mechanism of the reaction, illustrated below by the reaction of the pyromellitic dianhydride with 4,4′-diamino-diphenyl-dicarbonamide-3,3′ (Reaction 4, where Y is a direct bond), assumes the initial formation at ambient temperature of an essentially linear polyamide with free acid and amide groups (compounds of Formula L or isomers thereof). At this stage, the acid-amide polymer is perfectly soluble. One can precipitate it in a non-solvent, such as ether, water, acetone, petroleum ether, etc., and to preserve it in the form of a solid, it is preferably dried under vacuum at a temperature lower than 50–60° C.

The cyclization of the acid-amide polymer proceeds in two steps with the probable formation of a cyclic imide intermediate. The imidation reaction (FIGURE 4, where L yields J) is sufficiently rapid at a temperature higher than 100° C., preferably 120–200° C., whereas the cyclization into isoindoloquinazoline dione is not achieved until about 250–350° C. (Reaction 3 or 4, where J yields K).

(2) POLYCONDENSATION OF A DIANHYDRIDE WITH A BIS-(ORTHOAMINO-ESTER)

This reaction yields polymers which are not completely cyclized since ammonolysis of the ester functions is not a quantitative reaction. As in the precedingly described polycondensation reaction, it is possible to employ either a fusion reaction or a solution reaction. Without being bound by an explanation of the mechanism of the reaction for the formation of the polymers, it does appear that a soluble polymer is first formed, as for example shown in FIGURE 3 as Formula H which is specific to a soluble polymer of pyromellitic dianhydride reacted with 4,4′-diamino-diphenyl-ethyl dicarboxylate-3,3′.

This type of soluble polymer H can be cyclized into Formula I, wherein R represents a monovalent hydrocarbon radical, preferably alkyl of 1–6 carbon atoms, for example, ethyl, by heating the reaction solution to reflux conditions (generally 110–180° C., depending upon the solvent employed). To effect ammonolysis of the ester function, it is preferred to bubble in gaseous ammonia into a solution or suspension of the polymer in the solvent used for the reaction, or another solvent of the same type. The ammonolysis reaction is continued until a compound of Formula J is obtained, the duration of this reaction being, for example, about 2–24 hours. If the reaction is prolonged beyond the formation of compounds of Formula J, the gaseous ammonia can split and open up the cyclic imides, thereby forming polyamides in the polymeric chain. These opened rings do not, however, interfere with the ultimate cyclization reaction for the formation of the fused polymer rings.

The following description gives specific details relating to the scope and preparation of the starting materials which can be employed for the production of the polymers of this invention:

(1) AROMATIC BIS-(ORTHOAMINO-AMIDES)

It is possible to employ all amides of aromatic diacids, whether they be homocyclic or heterocyclic, but which possess an amine group in the ortho-position with respect to the amide function. Preferred species embraced by such amides include 4,6-diamino-isophthalamide and 2,5-diamino-terephthalamide, which are examples of compounds having reactive functional groups affixed on the same aromatic nucleus.

The reaction sites can also be present on different rings, these rings being either fused, or separated by a simple carbon to carbon bond, or a group such as methylene, carbonyl, oxide, sulfide, sulfoxide, sulfone, the group $-C(CH_3)_2-$, or any other similar bonding group. Preferred examples of such compounds include 3,7-diamino-naphthalene - dicarbonamide - 2,6, 4,4'-diamino-diphenyl-dicarbonamide-3,3', 4,4'-diamino-diphenyl-methanedicarbonamide - 3,3', 4,4' - diamino - benzophenone-dicarbonamide-3,3', as well as isomers, homologs, and analogs thereof.

To prepare the aforesaid compounds, there is described one possible synthesis route.

To produce the aromatic bis-(orthoamino-amides), by starting with the corresponding orthoamino-acids, there is provided a process comprising the following steps:

(a) Protecting (blocking) the amine groups, for example by sulfonation;

(b) Chlorinating the acid function by means of a conventional chlorination agent;

(c) Ammonolyzing the acid chlorides formed in step (b);

(d) Liberating the amine groups by cleaving the protecting groups therefrom.

(2) AROMATIC BIS-(ORTHOAMINO-ESTERS)

All possible esters of aromatic diacids, whether they be homocyclic or heterocyclic, can be employed, providing that an amine group is in the ortho-position with respect to the ester function.

The reactive sites can be situated either on the same aromatic ring, as in the case, for example, of diesters of 4,6-diamino-isophthalic acid, or those of 2,5-diamino-terephthalic acid. Conversely, the reactive sites can be positioned on rings which are fused to one another, or separated by a simple bond, or by one of the bonding groups previously mentioned in connection with the production of the corresponding amides. Preferred examples of those compounds having the reactive sites on different rings include 4,4' - diamino-diphenyl-dicarboethoxy-3,3', 4,4' - diamino - diphenylmethane - dicarbomethoxy - 3,3', 4,4'-diamino - diphenylsulfone - dicarboethoxy - 3,3', 2,6-diamino-naphthalene-dicarbomethoxy-3,7, as well as the isomers, homologs, and analogs thereof.

(3) DIANHYDRIDES

All dianhydrides of tetracarboxylic acids can be employed wherein there are two pairs of ortho-positioned acid groups. As preferred examples of such dianhydrides, there are included pyromellitic dianhydride, dianhydride of diphenyl-3,3',4,4'-tetracarboxylic acid, the dianhydride of naphthalene-2,3,6,7-tetracarboxylic acid, the dianhydride of perylene-3,4,9,10-tetracarboxylic acid, the dianhydride of benzophenone-3,3',4,4'-tetracarboxylic acid, the dianhydride of bis-(dicarboxy-3,4-phenyl)-sulfone, the dianhydride of bis-(dicarboxy-3,4-phenyl)-ether, and the various isomers, homologs. and analogs thereof.

The polymers produced by this invention exhibit an outstanding thermal stability, particularly in the case of the "stepladder" polymers. Consequently, these polymers can be used for a wide variety of applications, for example, in the form of fibers, films, or other shapes, or in the form of adhesives, and as bonding agents in the production of laminates and agglomerates. For all of these applications, those polymers are preferred wherein $R_1$ equals $NH_2$.

Referring to Formulae O, P, and R in FIGURE 5, the following table sets forth preferred specific polymers of this invention, as defined by $Ar_1$ and $Ar_2$.

TABLE

| No. | $Ar_1$ | $Ar_2$ |
|---|---|---|
| 1 | Benzene | Benzene. |
| 2 | do | Diphenyl. |
| 3 | Naphthalene | Diphenyloxide. |
| 4 | Diphenylmethane | Pyridine. |
| 5 | Diphenylsulfone | Quinoline. |
| 6 | Diphenyl | Naphthalene. |
| 7 | Diphenyloxide | Diphenyl-2,2 propane. |
| 8 | Thiophene | Pyrazine. |
| 9 | Perylene | N-methyldiphenylamine. |
| 10 | Phenanthrene | Benzophenone. |
| 11 | Benzophenone | Diphenylsulfoxide. |
| 12 | Acridine | Diphenylsulfide. |
| 13 | Pyridine | Diphenylsulfone. |
| 14 | Quinoline | Diphenylmethane. |
| 15 | Isoquinoline | Furane. |

For the production of films, filaments, varnishes, or fibers, it is preferred to employ a polymer having a degree of polycondensation such that its inherent viscosity, measured as on 0.5% by weight solution in dimethyl formamide at 30° C. is higher than 0.5. In this connection, the polymers corresponding to generic Formula O, or a mixture of (O+P) are particularly useful.

With respect to the production of laminates or agglomerates, it is preferred to employ a polymer having a lower degree of polycondensation, such that its inherent viscosity, as measured above, has a value of about 0.02–0.15. Again, the preferred polymer is of the Formula O or a mixture of (O+P). This low viscosity polymer can be utilized either in its pure state, or preferably in the form of a solution thereof in an inert solvent, particularly an inert polar solvent. The polymer in either of these forms is then impregnated into a mass of inert materials, such as fibers, filaments, or fabrics of glass, metal, carbon, asbestos, or graphite, etc. The thus-impregnated composition is then subjected to a heating step, for example, above 250° C., to effect polymerization and cyclization, and to furnish a resultant composition of the polymer corresponding to structural Formula R. It is preferred that the final products contain the reinforcing inert material in about a 10–60% by weight content, based on the polymer. The starting and intermediate compositions would have substantially the same ratios.

Particularly useful solvents for forming an impregnating solution are, for example, dimethyl sulfoxide, dimethyl acetamide, hexamethyl phosphoramide, dimethyl formamide, and tetramethylene sulfone.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1.—Preparation of 4,4-diamino-diphenyl-dicarbonamide-3,3'

(a) *Tosylation.*—There is dissolved 27.2 g. of 4,4'-diamino-diphenyl-dicarboxylic acid-3,3' in a solution of 52 g. of sodium carbonate in 300 ml. of water. To this solution, raised to 60–70° C., there is slowly added 46 g. of paratoluene sulfonyl chloride. After the latter has been added, the mixture is held at 70–75° C. for 30 minutes, and then raised to 85–90° C. for 5 minutes. To the resultant mixture, a small amount of decolorizing carbon is added, and then the mixture is filtered at 90–95° C.

The filtrate is neutralized by a mixture of equal parts by weight of concentrated HCl and water. A grey-violet solid precipitate is formed, which is then washed with dilute HCl and dried.

The yield of the raw tosylate is 90–97%. This product can be purified by dissolving it in 95% ethanol in a concentration of about 1 g. to 14–15 ml., said solution being heated. The resultant solution is then reprecipitated by the addition of water. The yield upon recrystallization is about 65–75%. The resultant product exhibits a melting point of 308–310° C.

(b) *Chlorination of the acid, and amidation.*— Into a container equipped with an agitator and a heating mantel, there is introduced 24.3 g. of bis-(paratoluene-sulfonyl-amino)-4,4'-diphenyl-dicarboxylic acid-3,3', as a suspension in 300 ml. of anhydrous benzene. To this suspension, there is added a single batch of 21 g. of $PCl_5$, and the resultant mixture is agitated at 55–65° C. for 30–45 minutes. The resultant clear brown solution is cooled to 30° C., and evaporated to dryness.

The resultant clear brown solid is redissolved in 350 ml. of anhydrous benzene and then subjected to treatment with a current of gaseous ammonia. The yield of the resultant diamide is 21 g. (87%). The thus-obtained bis-(paratoluene - sulfonylamino) - 4,4'-diphenyl - dicarbonamide-3,3' is recrystallized from nitrobenzene to yield a very pure compound having a fairly sharp melting point of 332° C.

(c) *Hydrolysis of the tosylate.*—Into warm concentrated sulfuric acid (of about 100° C.), there is dissolved 57.86 g. of the compound prepared in step (b). The resultant solution is maintained for about 15–20 minutes at the temperature, filtered, and then neutralized with concentrated ammonia. The yield of raw product is quantitative. By recrystallizing the resultant 4,4'-diamino-diphenyl-dicarbonamide-3,3' from dimethyl acetamide time, and a further sublimation at 320° C. at 0.2–0.5 mm. Hg, a very pure product is obtained having a melting point of 340° C.

Example 2.—Polycondensation of pyromellitic anhydride with 4,4'-diamino-diphenyl-dicarbonamide-3,3' by fusion An intimate mixture of 2.18 g. (0.01 mol) of pyromellitic dianhydride and 2.70 g. (0.01 mol) of 4,4'-diaminodiphenyl-dicarbonamide-3,3' is deaerated and maintained under an atmosphere of argon. The mixture is progressively heated to 235° C., maintained 15 minutes at this temperature, and then the mixture is raised to 350° C. At the latter temperature, the pressure is lowered to 0.2 mm. Hg, and the fused mixture is maintained under these conditions for 2 hours.

The resultant polymer has an inherent viscosity of 0.25, measured as an 0.5% by weight solution in concentrated sulfuric acid at 30° C. The IR spectrum and the percent composition correspond to poly-5H, 8H, 14H, 17H bis-quinazolino-(1,2-a:1',2'-a')-benzodipyrrol-(1,2c: 4,5c')-tetrone-5,8,14,17, which is polymer K shown in the drawings.

Example 3.—Polycondensation in solution of pyromellitic dianhydride with 4,4'-diamino-diphenyl - ethyl-dicarboxylate-3,3' (Reaction 3)

Into a 100 ml. container under an atmosphere of nitrogen, there is introduced 6.56 g. (0.02 mol) of 4,4'-diamino-diphenyl-ethyl-dicarboxylate-3,3' in a solution of 45 ml. of dimethyl acetamide. To this solution there is rapidly added a solution of 4.36 g. (0.02 mol) of pyromellitic dianhydride in 20 ml. of dimethyl acetamide. The solution becomes viscous and the temperature is increased a few degrees. It is then agitated for about one hour.

A small quantity of this solution is precipitated in water; the resultant precipitate is washed in ethanol, and then dried, and exhibits an inherent viscosity of 0.15, measured as an 0.5% by weight solution in dimethyl sulfoxide at 30° C. The IR spectrum and percentile composition correspond to that of structural Formula H of the drawings (or an isomer thereof) wherein $R=C_2H_5$ and Y is a single bond.

The preceding solution is heated to the reflux temperature of the solvent (about 160° C.) for about 7½ hours. a greenish-white fine precipitate is slowly formed and then separated by filtration and washed with acetic acid, ethanol, and ether. The resultant composition is soluble in dimethyl sulfoxide, concentrated sulfuric acid, and metacresol. It exhibits an inherent viscosity, measured in an 0.5% by weight solution in dimethyl sulfoxide at 30° C., of 0.13. The IR spectrum indicates the formation of imide rings, and the percent-by-weight analysis is very close to the theoretical value calculated for the polymer identified in the drawings as I, wherein R=ethyl, and Y represents a single bond.

The previously prepared composition is suspended in dimethyl acetamide and treated with gaseous ammonia for about 15 hours. The solids are progressively dissolved, with the formation of a moderately viscous, orange solution. One part of this solution is precipitated in acetone, under vigorous agitation. The resultant polymer exhibits an IR spectrum and a composition very close to the characteristic values of the polymer identified in the drawings as J, wherein Y represents a single bond.

The product corresponding to Formula J is refluxed with acetic anhydride for 10 hours, or thermally treated under an inert atmosphere for 1 hour at 350–400° C. This results in a cyclization of the compound into poly-bis-quinazolinobenzodipyrrole-tetrone, the same as produced in Example 2 (Formula K. The IR spectrum and the empirical analysis correspond very well to that found in Example 2. The inherent viscosity of the product is 0.13, as measured in an 0.2% by weight solution of concentrated sulfuric acid at 30° C.

Example 4.—Polycondensation of pyromellitic dianhyhydride with 4,4'-diamino-diphenyl-dicarbonamide-3,3' in the presence of a solvent (Reaction 4)

Into a 250 ml. container, protected from humidity and maintained under an inert atmosphere, there is introduced 2.7 g. (0.01 mol) of 4,4'-diamino-diphenyl-dicarbonamide-3,3' in a suspension of 15 ml. of anhydrous dimethyl formamide. Within a few seconds, there is added to this suspension a second solution of 2.18 g. (0.01 mol) of pyromellitic dianhydride in 10 ml. of dimethyl formamide. The reaction is instantaneous, the temperature of the solution being raised several degrees, and the diamine being dissolved very rapidly. The golden-yellow solution becomes very viscous, and at the end of 1 or 2 hours, it can be extended in the form of a film, or it can be precipitated in a non-solvent. The resultant precipitated polymer exhibits a structure corresponding to that of Formula L of the drawings, wherein Y is a single bond, or a structural isomer thereof which is not shown. This polymer has an inherent viscosity of 0.5, measured as an 0.5% by weight solution in dimethyl formamide at 30° C.

A part of this solution is precipitated in acetone. The very clear yellow precipitate is washed several times by acetone, and then dried. The empirical analysis corresponds to that of Formula L, and the IR spectrum of a film of 10 microns in thickness, based on this polymer, yields characteristic bands for acid and amide functions.

The polymer L can be cyclized into an imide by heating a solution thereof in dimethyl formamide to the reflux temperature of the solvent for several hours. Alternatively, cyclization can be conducted by pouring the solution of the polymer L into a dehydrating mixture, such as a mixture of pyridine-acetic anhydride. A still further method can be employed wherein the polymer L is precipitated in a non-solvent, dried, and treated by either a desiccant, or under a vacuum at a temperature of about 100–200° C. Analysis of the resultant cyclized product leads to a structure corresponding to that of the polyamide of Formula J, the IR spectrum yielding characteristic bands of imides and primary amides. This polyimide is now ready for the second step of cyclization.

By subjecting polyamide J to refluxing conditions with acetic anhydride, or under a vacuum at 200–350° C., the compound is cyclized into poly-bis-quinazolinobenzodi-pyrrole-tetrone, Formula K, as indicated in the preceding examples wherein Y represents a single bond.

Example 5.—Preparation of a "stepladder" polymer by polycondensation of 2,5-diamino-terephthalamide with pyromellitic dianhydride in the presence of a solvent reaction 1)

In accordance with the process set forth in Example 1, 2,5-diamino-terephthalamide is prepared from diamino-terephthalic acid. This compound is then reacted with pyromellitic dianhydride, as indicated in Example 4, in order to effect polycondensation. The acid-amide polymer (B and/or B′) is precipitated in acetone, dried, and treated under vacuum for 2 hours at 350° C. The resultant polymer exhibits an inherent viscosity, measured as an 0.2% by weight solution in concentrated sulfuric acid at 30° C., of 0.27. Empirical analysis of the polymer indicates that it corresponds to the theoretical value calculated for polymer D and/or D′.

Example 6.—Polycondensation of the dianhydride of benzophenonetetracarboxylic acid-3,3′ with 4,4′-di-amino-diphenyl-dicarbonamide-3,3′-(Reaction 2, wherein X=—CO— and Y is a single bond)

The polycondensation is conducted stepwise in dimethyl acetamide, following the process indicated in Example 4. The acid-amide polymer (E or an isomer thereof) exhibits an inherent viscosity, measured as an 0.5% by weight solution in dimethyl formamide at 30° C., of 0.50.

The polymer is cyclized at 350–375° C. for two hours, and thereafter exhibits an empirical composition corresponding to oxo-bis-(isoindoloquinazoline dione), corresponding to structural Formula G or an isomer thereof.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A polymer consisting essentially of a repeating unit of the formula

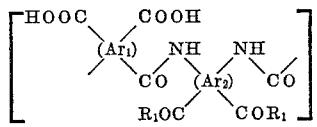

wherein:
   $Ar_1$ and $Ar_2$ are aromatic radicals having two pairs of ortho-positioned free valences, and
   $R_1$ is —$NH_2$ or —OR, where R is a monovalent hydrocarbon radical said polymer being suitable for the production of films and fibers.

2. A polymer as defined by claim 1, wherein
   $Ar_1$ is selected from the group consisting of benzene, naphthalene, diphenylmethane, diphenylsulfone, diphenyl, diphenyloxide, thiophene, perylene, phenanthrene, benzophenone, acridine, pyridine, quinoline and isoquinoline; and
   $Ar_2$ is selected from the group consisting of benzene, diphenyl, diphenyloxide, pyridine, quinoline, naphthalene, diphenyl-2,2 propane, pyrazine, N-methyl-diphenylamine, benzophenone, diphenylsulfoxide, diphenylsulfide, diphenylsulfone, diphenylmethane and furane.

3. A polymer consisting essentially of a repeating unit of the formula

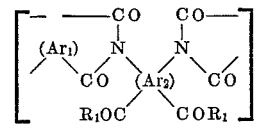

wherein:
   $Ar_1$ and $Ar_2$ are aromatic radicals having two pairs of ortho-positioned free valences, and
   $R_1$ is —$NH_2$ or —OR, where R is a monovalent hydrocarbon radical said polymer being suitable for the production of films and fibers.

4. A polymer as defined by claim 3 wherein
   $Ar_1$ is selected from the group consisting of benzene, naphthalene, diphenylmethane, diphenylsulfone, diphenyl, diphenyloxide, thiophene, perylene, phenanthrene, benzophenone, acridine, pyridine, quinoline and isoquinoline; and
   $Ar_2$ is selected from the group consisting of benzene, diphenyl, diphenyloxide, pyridine, quinoline, naphthalene, diphenyl-2,2 propane, pyrazine, N-methyl-diphenylamine, benzophenone, diphenylsulfoxide, diphenylsulfide, diphenylsulfone, diphenylmethane and furane.

5. A polymer consisting essentially of a repeating unit of the formula

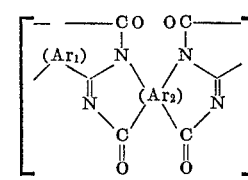

wherein:
   $Ar_1$ and $Ar_2$ are aromatic radicals having two pairs of ortho-positioned free valences, and
   $R_1$ is —$NH_2$ or —OR, where R is a monovalent hydrocarbon radical said polymer being suitable for the production of films and fibers.

6. A polymer as defined by claim 3, wherein
   $Ar_1$ is selected from the group consisting of benzene, naphthalene, diphenylmethane, diphenylsulfone, diphenyl, diphenyloxide, thiophene, perylene, phenanthrene, benzophenone, acridine, pyridine, quinoline and isoquinoline; and
   $Ar_2$ is selected from the group consisting of benzene, diphenyl, diphenyloxide, pyridine, quinoline, naphthalene, diphenyl-2,2 propane, pyrazine, N-methyl-diphenylamine, benzophenone, diphenylsulfoxide, diphenylsulfide, diphenylsulfone, diphenylmethane and furane.

7. A process for the production of a polymer as defined by claim 1, said process comprising reacting in an insert polar solvent at a temperature lower than 100° C. a compound of the formula

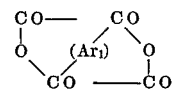

and with a compound of the formula

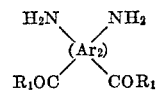

8. A process as defined by claim 7, wherein the reaction temperature is lower than 60° C.

9. A process for the production of a polymer as defined by claim 3, wherein there is heated to about 100–

250° C. in an inert polar solvent a mixture of a dianhydride of the formula

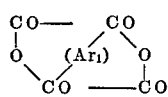

with a compound of formula

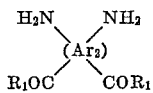

10. A process as defined by claim 9, wherein the reaction temperature is 120–200° C.

11. A process for the production of a polymer as defined by claim 5, wherein there is heated to about 250–350° C. a mixture in an inert polar solvent of a dianhydride of the formula

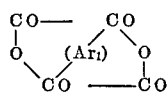

with a compound of formula

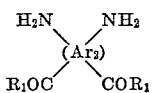

wherein $R_1$ is $NH_2$.

12. A process for the production of impregnated materials containing a polymer as defined by claim 5, wherein inert materials are impregnated with a polymer of the formula

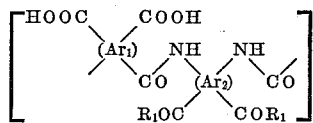

and increasing the temperature of the resultant impregnated material to higher than 250° C.

13. A process for the production of impregnated materials containing a polymer as defined by claim 5, wherein inert materials are impregnated with a polymer of the formula

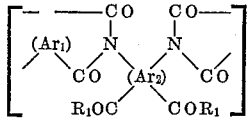

wherein $R_1$ is $NH_2$, and increasing the temperature of the resultant impregnated material to higher than 250° C.

14. Poly-5H, 8H, 14H, 17H bis-quinazolino-(1,2-a:1′, 2′-a′)-benzodipyrrol-(1,2c:4,5c′)-tetrone-5, 8, 14, 17 said polymer being suitable for the production of films and fibers.

References Cited

Dawans et al.: Polymers from Ortho Aromatic Tetraamines and Aromatic Dianhydrides, Journal of Polymer Science, Part A, vol. 3 (pp. 35–49–50 and 3565–3569), Nov. 8, 1965.

WILLIAM H. SHORT, Primary Examiner

L. L. LEE, Assistant Examiner

U.S. Cl. X.R.

117—132; 161—197, 205, 214, 227; 260—30, 32, 65, 78